(12) United States Patent
Wedl

(10) Patent No.: US 12,112,385 B2
(45) Date of Patent: Oct. 8, 2024

(54) DIGITAL MULTI-CHANNEL DATA-TRANSFER AND RECOGNITION PLATFORM, AND METHOD THEREOF

(71) Applicant: Swiss Reinsurance Company Ltd., Zürich (CH)

(72) Inventor: Boris Wedl, Zürich (CH)

(73) Assignee: Swiss Reinsurance Company Ltd., Zürich (CH)

( * ) Notice: Subject to any disclaimer, the term of this patent is extended or adjusted under 35 U.S.C. 154(b) by 89 days.

(21) Appl. No.: 17/935,452

(22) Filed: Sep. 26, 2022

(65) Prior Publication Data

US 2023/0022511 A1 Jan. 26, 2023

Related U.S. Application Data

(63) Continuation of application No. PCT/EP2021/066520, filed on Jun. 17, 2021.

(51) Int. Cl.
*G06Q 40/08* (2012.01)
*G06F 40/205* (2020.01)
*G06F 40/284* (2020.01)
*H04L 67/50* (2022.01)

(52) U.S. Cl.
CPC .......... *G06Q 40/08* (2013.01); *G06F 40/205* (2020.01); *G06F 40/284* (2020.01); *H04L 67/50* (2022.05)

(58) Field of Classification Search
CPC ..... G06F 40/284; G06F 40/205; G06Q 40/08; H04L 67/50
See application file for complete search history.

(56) References Cited

FOREIGN PATENT DOCUMENTS

WO   WO-2018005203 A1 * 1/2018 ........... G06F 16/353

* cited by examiner

*Primary Examiner* — Suraj M Joshi
(74) *Attorney, Agent, or Firm* — Oblon, McClelland, Maier & Neustadt, L.L.P.

(57) ABSTRACT

Proposed is a digital multi-channel platform based on a multi-channel, high-layer data-transfer structure accessible by means of web-client applications running on front-end network-enabled devices providing discrete high-layer data-flow and capturing of structured and unstructured data content transferred from the front-end network-enabled devices over a data transmission network to a digital multi-channel back-end system.

22 Claims, 14 Drawing Sheets

New Case

Case details   Activity

Documents         Figure 8a

Life and Products

Additional Comments

New case

Swiss Re ref. ID: —    Created by: Jasmine Johnson    Referral history: Referral 3/3 ▼

Cancel    Save draft    Submit

Case details   Activity

Your reference ID

Currency ▼

Documents ⓘ

Drag & drop file(s) or select file(s) here

Products

For Invalidity and Disability products, the insured amounts must be entered in an annual amount.

Product

My decision          Swiss Re decision

No decision available yet.

Product

Decision

Sum assured

Term of policy

+ Add combo product    + Add product

Fig. 8c

```
 1  {
 2      "YourReferenceID": "FF0.001",
 3      "Currency": "USD",
 4      "Lives": [
 5          {
 6              "LastName": "Fox",
 7              "FirstName": "Foxy",
 8              "MiddleName":"F.",
 9              "DateOfBirth": "19900909",
10              "Gender": "Male",
11              "Smoker": "Unknown",
12              "ReferralReason": {
13                  "AboveAuthority": false,
14                  "Medical": false,
15                  "Financial": false,
16                  "Sport": false,
17                  "ResidenceTravel": false,
18                  "Occupational": false,
19                  "RequestForCapacity": false,
20                  "CommercialDecision": true
21              },
22              "Products": [
23                  {
24                      "Product": "Life",
25                      "SumAssured": 999999,
26                      "TermOfPolicy": "Whole Life",
27                      "Decision": "Standard"
28                  }
29              ]
30          }
31      ],
32      "Comments":"Фокс любит отдыхать на очень большом ящике пива."
33  }
```

Fig. 10

DIGITAL MULTI-CHANNEL DATA-TRANSFER AND RECOGNITION PLATFORM, AND METHOD THEREOF

CROSS REFERENCE TO RELATED APPLICATION

The present application is a continuation of International Patent Application No. PCT/EP2021/066520, filed Jun. 17, 2021, the contents of which are hereby incorporated by reference in its entirety.

FIELD OF THE INVENTION

The present invention relates to digital platforms and systems with multi-channel data-transfer structures accessible by means of web-client applications running on front-end network-enabled devices and providing discrete data-flow and capturing of structured and unstructured data content transferred from the front-end network-enabled devices to a digital multi-channel platform. In particular, it relates to digital systems for dynamically determining the necessary mappings independent from syntactical/semantical format requirements.

BACKGROUND OF THE INVENTION

In the risk mitigation industry, it is a need for entities such as operators, carriers or brokers that administer loss-related event-impact triggered claims and enrollment or underwriting information data to initially and afterwards periodically evaluate the data that have already been processed and/or which loss has already been covered under each conducted risk-transfer (i.e. valid defined policy parameters) to assess the cost and utilization associated with the policy and/or for a variety of other technical reasons, such as fraud prevention or detection. However, automated data collection and processing prior to substantive analysis of the data is typically a time consuming and expensive process. First, the data and relevant parameter values from each data source are typically submitted in one or more non-standardized data formats, requiring reformatting and recognition of the data prior to being enabled to conduct automated data analysis. Thus, the individuals working with the data from multiple sources must have computer programming skills in addition to business analysis skills. Then, once the data have been formatted and appropriately captured, it must be quality checked for formatting and data accuracy as well as for compliance with industry or carrier norms or trends. These quality checking processes are typically time-consuming, tedious and labor-intensive processes that require individuals to manually review thousands of data items. As a result, human error in the quality checking processes is not uncommon. Thus, there is a need for automated systems that are technically enabled to address the drawbacks of the existing technical approaches to automate formatting and quality checking of data to prepare the data for analysis, for example, by employers, risk-transfer administrators or other entities, as carriers or brokers.

In particular in the risk-transfer industry, data are measured or otherwise captured and/or generated and/or stored in a wide variety of formats. For example, agencies and brokers responsible for the application of appropriate data often obtain information from their consumers via traditional telephone calls and personal meetings to meet requirements for submission of information to carriers for quotes and renewals. Such information may be extensive in nature and time consuming to obtain. Such data are then typically stored in a variety of formats, such as various personal computer applications and office software spreadsheet and database formats, or in field specific formats adapted to the risk-transfer need, such as measuring parameter values necessary to determine preferred probability/risk classes or measure the occurrence or occurrence frequency of the actual occurring real-world event physically impacting and affecting the loss measured at the unit exposed to the occurring event. Risk-transfer systems and automated insurance systems that receive such data may have a requirement to format the data in a predetermined format. For example, the ACORD XML format is an XML format specific to the risk-transfer industry. In addition, individual risk-transfer systems typically have varying requirements for format and data types in order to prepare quotes and engage in other risk-transfer related processing or transactions. As a result of the variation in formats, data that is stored in one format often must be manually rekeyed or manually reformatted for use by another entity, resulting in unnecessary expense and risk of errors.

Another technical problem is related to the inter-machine exchange of such data of automated, data-exchanging systems, for example, between carriers and reinsurers, the latter e.g. monitoring or verifying the risk-capturing of the carrier systems, or between broker systems and carrier or reinsurance systems. Due to the various technical approaches (i) to measure probabilities and/or rates of occurrences of loss-impacting physical events to risk-exposed units and/or to measure the probabilities and/or rates of occurrences of losses associated with the occurrence of an impacting physical real-world event associated with a risk-exposed unit, i.e. the risk to measure a certain impact to a risk-exposed unit upon occurrence of an impacting physical event at a certain occurrence strength (e.g. earthquake strength, wind storm strength), (ii) the various technical approaches to select and to weight the relevant measuring parameters and consider possible correlations of the parameters, and (iii) the various approaches to capture, format and store the measured data and to ensure the required security measures for sensible data, in the risk-transfer technology, data measuring, capturing, exchange and transfer procedures require a carefully synchronized, coordinated, matched, and complete bundling of highly-specialized and specific human and material components, including providers, such as carriers, brokers or telematics service providers. These components of invasive and/or operative procedures may be found in uncoordinated and different locations. This leads to inefficiencies and price increases.

SUMMARY OF THE INVENTION

It is an object of the invention to provide a reliable technical system which does not rely on the drawbacks of existing processes for data compilation and formatting as described above, the present invention provides a system and method for automating the data collection, reformatting and quality checking processes described above. In particular, the system should be able to automatically map structured and unstructured data to populate predefined input form structures thus avoiding manual input. First, the system should be able to provide for formatting of risk-transfer submissions (underwriting/claim validation) or other types of data from various data providers in the provider's own format into a common data format using a web-based data formatting software application. Second, the system should be able to provide for automated quality checking of the structure and/or completeness (e.g., presence of data in defined fields, number of records or length of records) of the received data. Third, the system should be able to provide for automated quality processing of the data to verify compliance of the data compared to predefined norms for submissions or claims filed under various requirements of different policies. Data that are not complete, have structural variations or do not comply with one or more of the requirements should be able to be flagged, for example, using a second more sophisticated review process to resolve the non-compliance issue. Once data is approved, either automatically or upon completion of the review process, the approved data may be made available for download for subsequent use in data analysis processes concerning many aspects of risk-transfer operations, including the cost/premiums of payments under each policy (as set of predefined risk-transfer parameters). The system should also be able to be applied to format and quality process other types of structured and unstructured data in addition to risk-related data and measuring parameters, such as general health and life data, property data, in particular smart home/city data, telematics data, and/or vehicle-related or industrial-processing-related data. Most particularly, the system should be enabled to dynamically determine the necessary mappings to make the inventive system independent from syntactical/semantical format requirements of data transmitted to the system.

According to the present invention, these objects are achieved particularly through the features of the independent claims. In addition, further advantageous embodiments follow from the dependent claims and the description.

According to the present invention, the abovementioned objects are particularly achieved in that the digital multi-channel platform is based on a multi-channel, high-layer data-transfer structure accessible by means of web-client applications running on front-end network-enabled devices providing discrete high-layer data-flow and capturing of structured and unstructured data content transferred from the network-enabled devices over a data transmission network to a digital multi-channel back-end system, wherein a first digital transmission channel comprises a form-based data-entry provided by a graphical user data interface of the web-client applications for structured data content transmission from the network-enabled devices to the digital multi-channel back-end system, wherein a second digital transmission channel comprises a file-based data entry provided by the graphical user data interface for unstructured data content transmission by means of a transferable file from the network-enabled devices to the digital multi-channel back-end system, wherein the digital multi-channel back-end system comprises a bidirectional data exchange gateway providing bidirectional data exchange for the data content transmission between the digital multi-channel back-end system and the network-enabled devices, and wherein the bidirectional data exchange is steered and/or operated by a data validation/enrichment process of a central processing unit and/or core engine of the digital multi-channel back-end system, in that the digital multi-channel back-end system comprises a parser-matcher logic for scanning and recognizing the unstructured data content transferred by a formatted file via the second digital transmission channel, the unstructured data content of the transferred formatted file comprising at least text formatting and/or image formatting and/or sound formatting, wherein the parser-matcher logic comprises an extraction module for extracting structured data content out of the unstructured data content comprised in the formatted file by capturing data values from raw data of the unstructured data content, and connecting data fragments scattered in the unstructured data content, and storing the extracted structured data content in a parseable data file format for further processing in a persistence storage, and in that the parser-matcher logic comprises a parser parsing the extracted structured data content for key-values, mapping and populating the key-values and/or extracted structured data content based on a predefined form structure. The inventive system 1 as well as the extended inventive system 1 have, inter alia, the advantages that they (i) Reduce manual interaction and typing effort by (a) prepopulating form fields online, and (b) the ability to capture additional structured data; (ii) Syntactical and semantical independence (ease of deployment); (iii) Low latency front-end implementation; (iv) Opening a transition path to service integration; and (v) Enabling additional technical functionalities.

BRIEF DESCRIPTION OF THE DRAWINGS

The present invention will be explained in more detail below relying on examples and with reference to these drawings in which:

FIGS. 8 to 10 show diagrams illustrating schematically the process of extracting the structured data (e.g. JavaScript Object Notation (JSON)) from the formatted pdf-file which is a process of deserialization by extracting structured data from the unstructured content of a formatted file (e.g. pdf-file). FIG. 8 shows an exemplary GUI for capturing (a) structured data (see e.g. under the labels "Case details" and "Life and products") and (b) unstructured data embedded in an attached, formatted file, e.g. a pdf-file (see label "Drag & drop file(s) or select file(s) here"). An extracted picture, as shown in FIG. 9, is accompanied by a structured JSON file, shown in FIG. 10, where the key-values can be extracted.

DETAILED DESCRIPTION OF THE PREFERRED EMBODIMENTS

Figure 1:
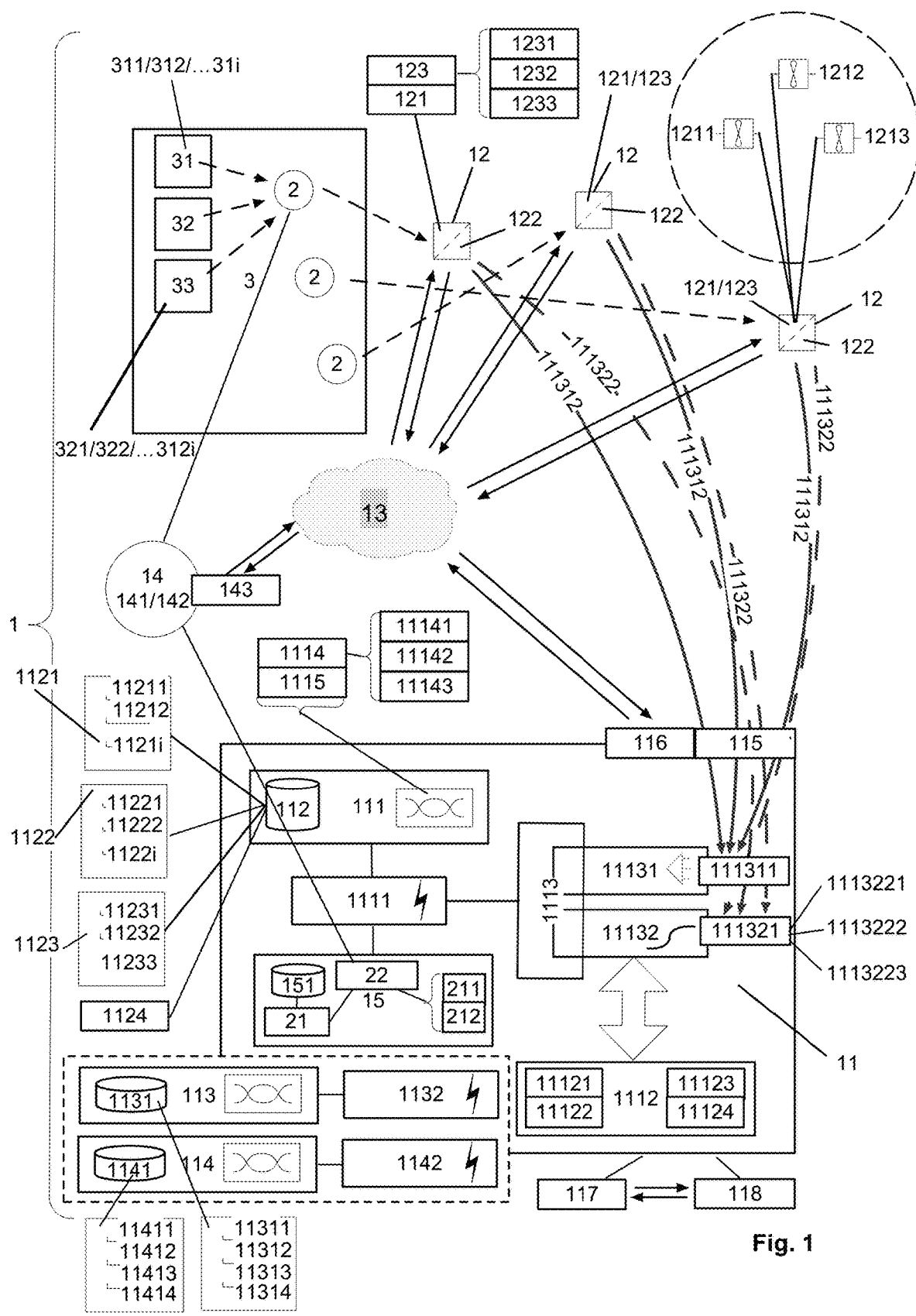
FIG. 1 shows a block diagram, schematically illustrating an exemplary digital multi-channel platform 1 based on a multi-channel, high-layer data-transfer structure 1113 accessible by means of web-client applications 121 running on front-end network-enabled devices 12 providing discrete high-layer data-flow and capturing of structured 1121 and unstructured 1122 data 11141 a digital multi-channel back-end system 11.

FIG. 1 schematically illustrate an architecture for a possible implementation of an embodiment of the inventive digital multi-channel platform 1 based on a multi-channel, high-layer data-transfer structure 1113 accessible by means of web-client applications 121 running on front-end network-enabled devices 12 providing discrete high-layer data-flow and capturing of structured 1121 and unstructured 1122 data content transferred from the front-end network-enabled devices 12 over a data transmission network 13 via network interfaces 116 and 122 to a digital multi-channel back-end system 11.

A first digital transmission channel 11131 comprises a form-based data-entry 111311 provided by a graphical user data interface 1213 of the web-client applications 121 for structured data content 1121 transmission 111312 from the network-enabled devices 12 to the digital multi-channel back-end system 11. A second digital transmission channel 11132 comprises a file-based data entry 111321 provided by the graphical user data interface 1213 for unstructured data content 1122 transmission 111322 by means of a transferable file from the network-enabled devices 12 to the digital multi-channel back-end system 11.

The digital multi-channel back-end system 11 comprises a bidirectional data exchange gateway 115 providing bidirectional data exchange for the data content transmission 111312/111322 between the digital multi-channel back-end system 11 and the network-enabled devices 12. The bidirectional data exchange is steered and/or operated by a data validation/enrichment process of a central processing unit 1111 and/or core engine 111 of the digital multi-channel back-end system 11.

The digital multi-channel back-end system 11 comprises a parser-matcher logic 1114 for scanning and recognizing the unstructured data content 1122 transferred by a formatted file 1113221 via the second digital transmission channel 11132. The unstructured data content 1122 of the transferred formatted file comprises at least text formatting and/or image formatting and/or sound formatting. The formatted file 1113221 can e.g. be realized as a portable, platform-independent formatted file 1113222 comprising the unstructured data content 1122. The formatted file 1113223 can further e.g. be realized as a PDF-file in portable document format (PDF) comprising the unstructured data content 1122, each PDF-file encapsulating a description of a fixed-layout flat document at least comprising text content and fonts and/or vector graphics and/or raster images and/or further format-relevant information. The PDF-file can e.g. further comprise content besides flat text and/or graphics including logical structuring elements and/or interactive elements and/or three-dimensional objects. The interactive elements can e.g. comprise annotations and form-fields and/or layers and/or rich media comprising video content. The three-dimensional objects can e.g. be realized using Universal 3D (U3D) format or Product Representation Compact (PRC) format or any other data format. The description can e.g. further comprise encryption and/or digital signatures and/or file attachments and/or metadata to enable workflows requiring these features.

Figure 2:
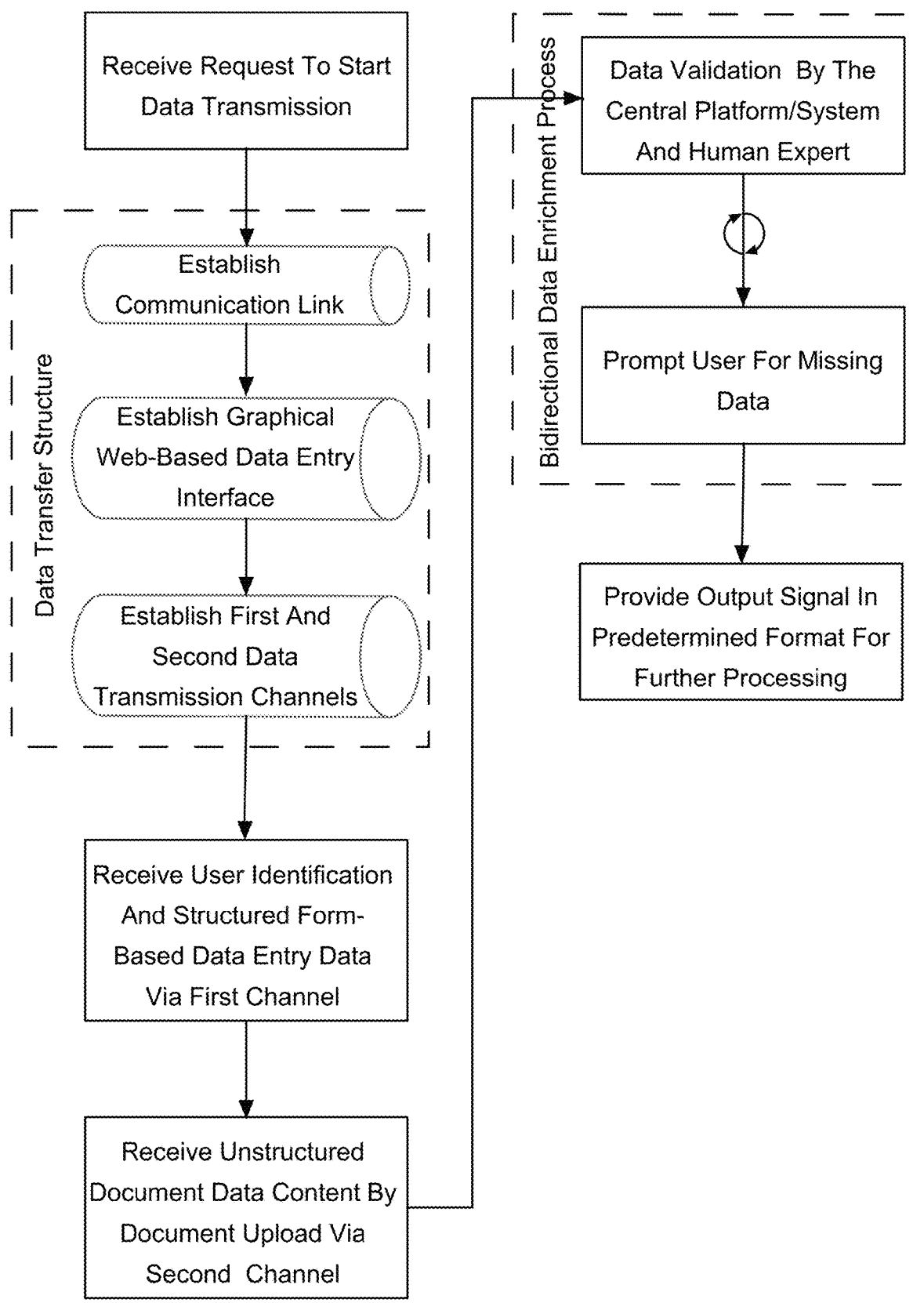
FIGS. 2 and 3 show diagrams (FIG. 2 a flow diagram/FIG. 3 a block diagram) illustrating schematically an exemplary basis for the inventive system 1 allowing a client to submit via a client system 12 underwriting (UW) submission or (UW/claim) case information comprising structured and document content via a web-application 121 and receive risk-transfer case decision or claim validation in return. The system (FIG. 3, part on the left) is integrated with an internal system 113 and features the following functionality: (i) Form based data entry; (ii) Document upload, (iii) Bidirectional data exchange; and (iv) Data validation/enrichment by the client system 12 and/or the external system 114 (client to internal system 113) and through an internal system's data processing.
Figure 3:
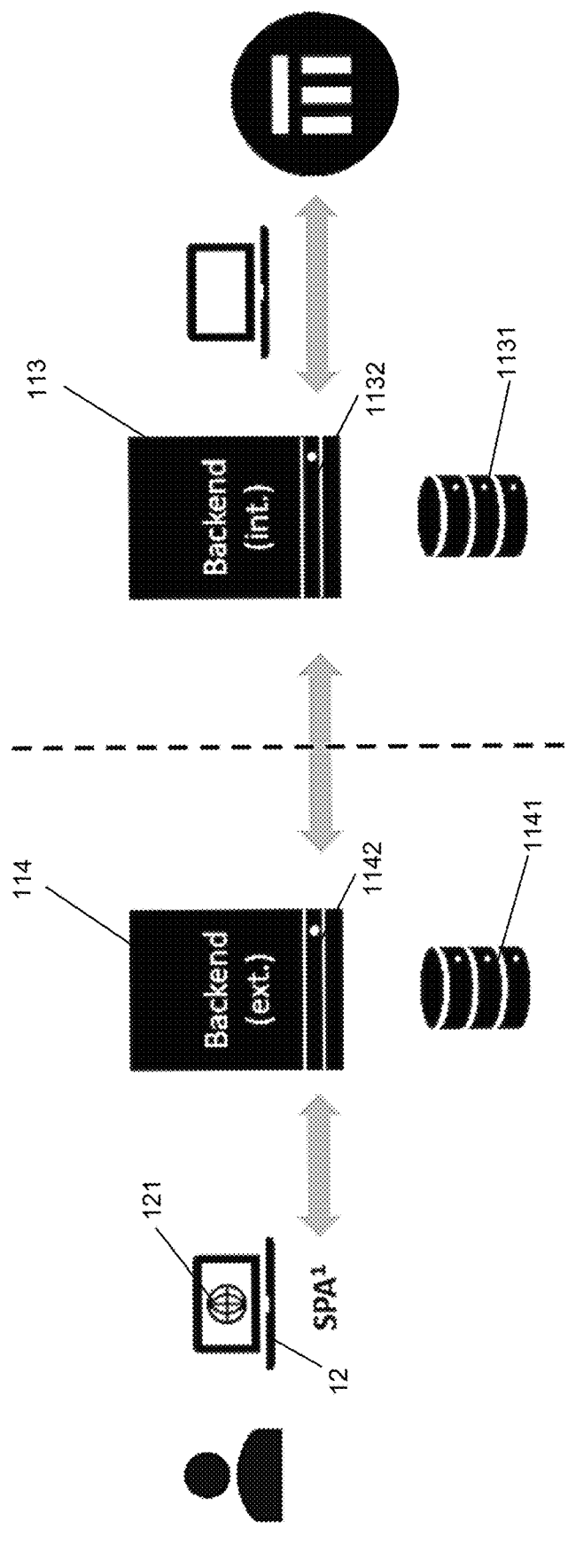
Figure 4:
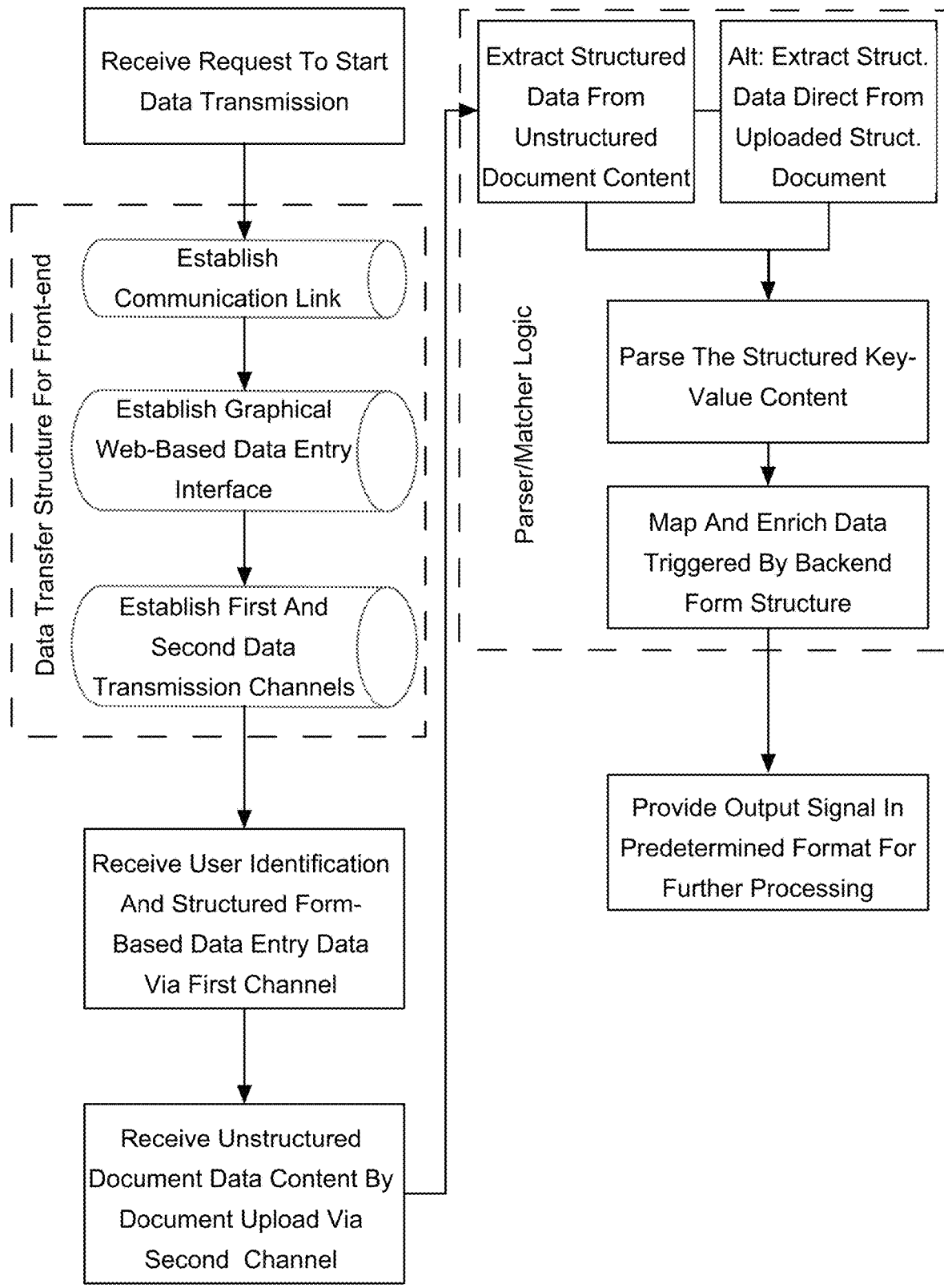
FIGS. 4 and 5 show diagrams (FIG. 4 a flow diagram/FIG. 5 a block diagram) illustrating schematically an exemplary system 1 according to the invention comprising the following additional features to the basis system of FIGS. 2 and 3 (see FIG. 5): (i) Extract structured data (e.g. JavaScript Object Notation (JSON)) from a Portable Document Format (PDF) (alternatively a structured file can be uploaded directly); (ii) Parse the structured JSON (key-value) content; (iii) Map and populate the data into the submission form low latency implementation (front-end only). This enables the user to securely upload a document (PDF) with a structured file (JSON) attached or the structured file as such, which is extracted by the inventive system 1 and its content used to populate the input form. The structured content however is required to follow a certain syntactical and semantical format to be recognizable by the parser/matcher logic.
Figure 5:
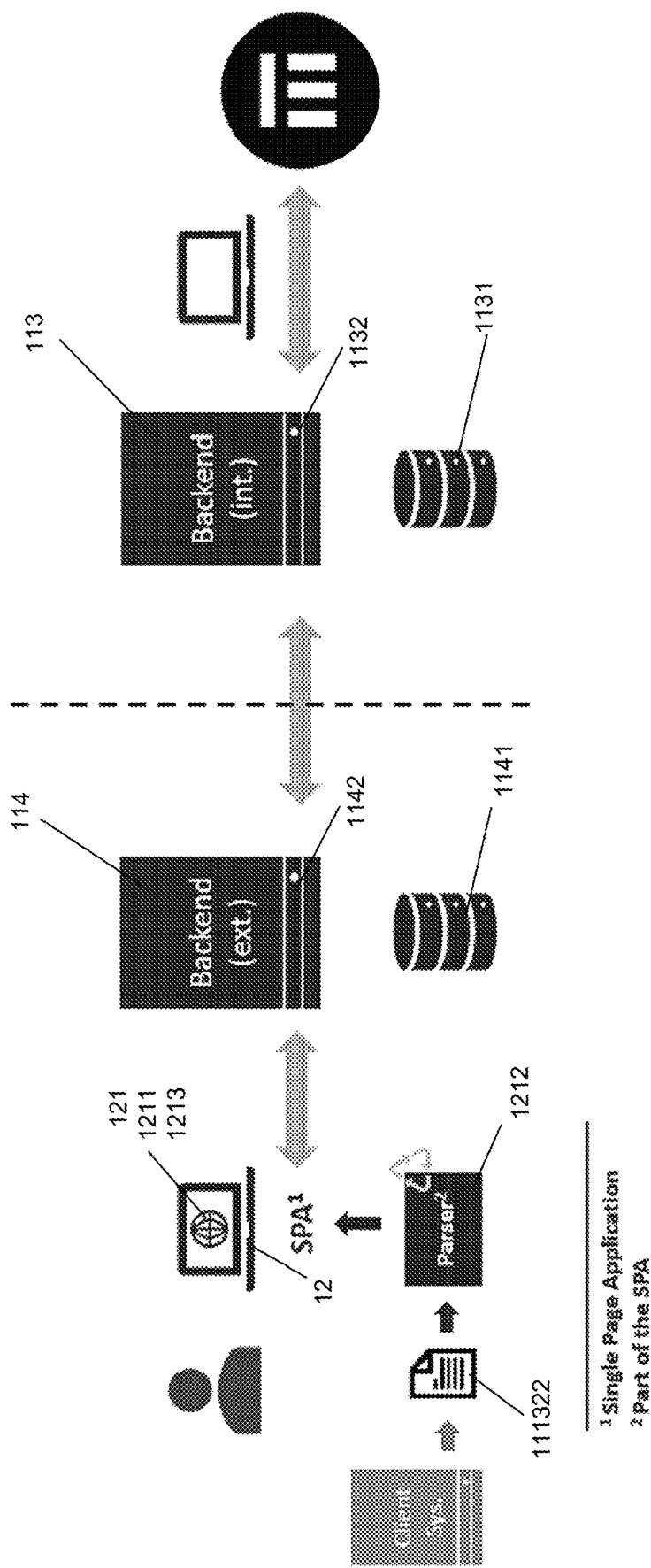
Figure 6:
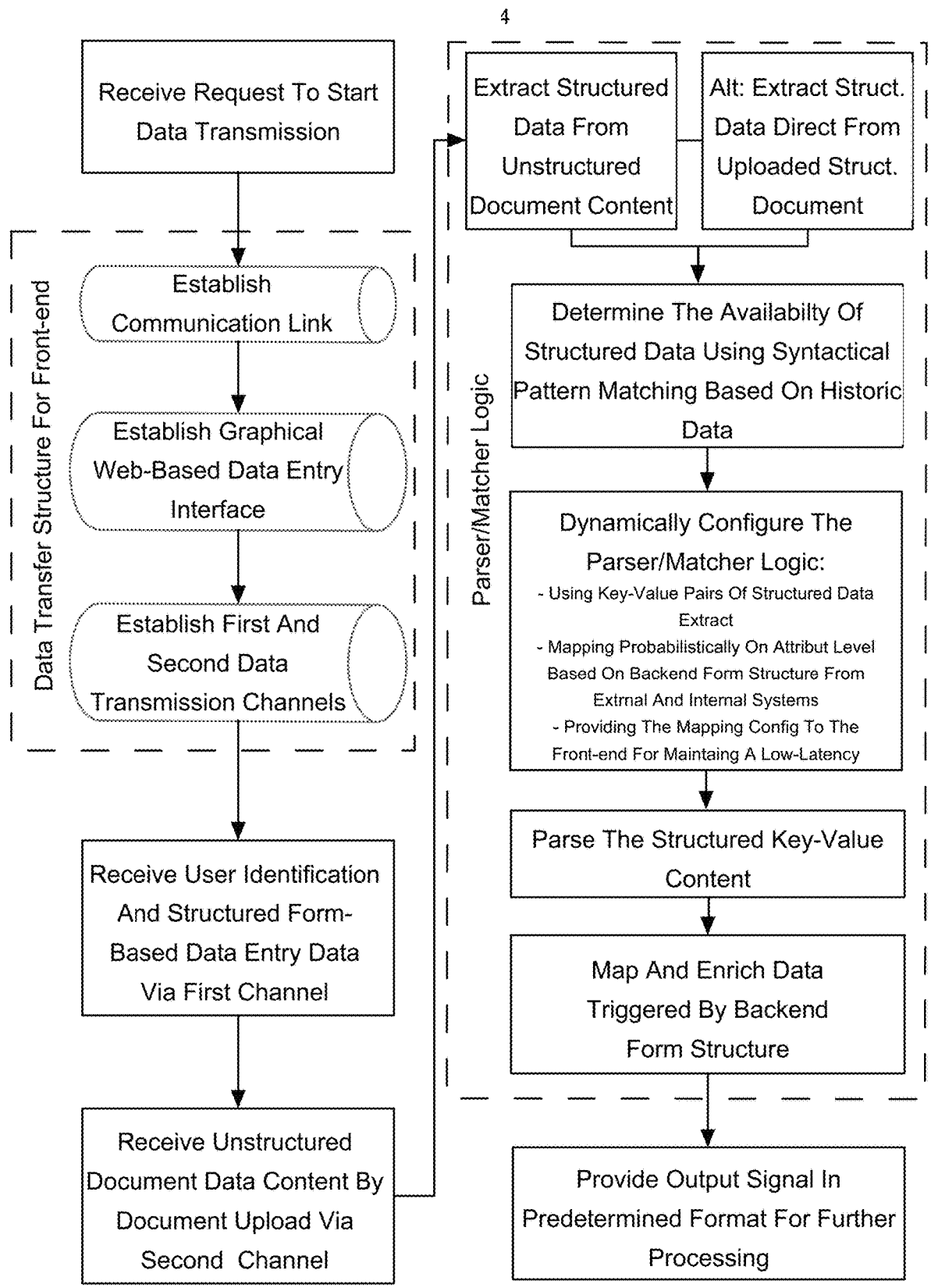
FIGS. 6 and 7 show diagrams (FIG. 6 a flow diagram/FIG. 7 a block diagram) illustrating schematically an exemplary extended system 1 with dynamic parsing according to the invention comprising an extended way the parser-matcher logic 1114 works overcoming the syntactical/semantical dependency to a file format structure and at the same time maintaining a low latency operation. The enhanced features comprise: (i) Heuristically determine the availability of structured data using syntactical analysis; and (ii) Dynamically configure the parser/matching logic: (a) Using the structured data extract (key-value pairs) mapped (probabilistically on attribute level) based on the backend data from the external and internal systems 113/114 and (b) Providing this mapping config to the front-end system 12 therefore maintaining a low-latency implementation. The implementation of the parser configuration algorithm may support different levels of sophistication ranging from naïve probabilistic methods to more advanced techniques.
Figure 7:
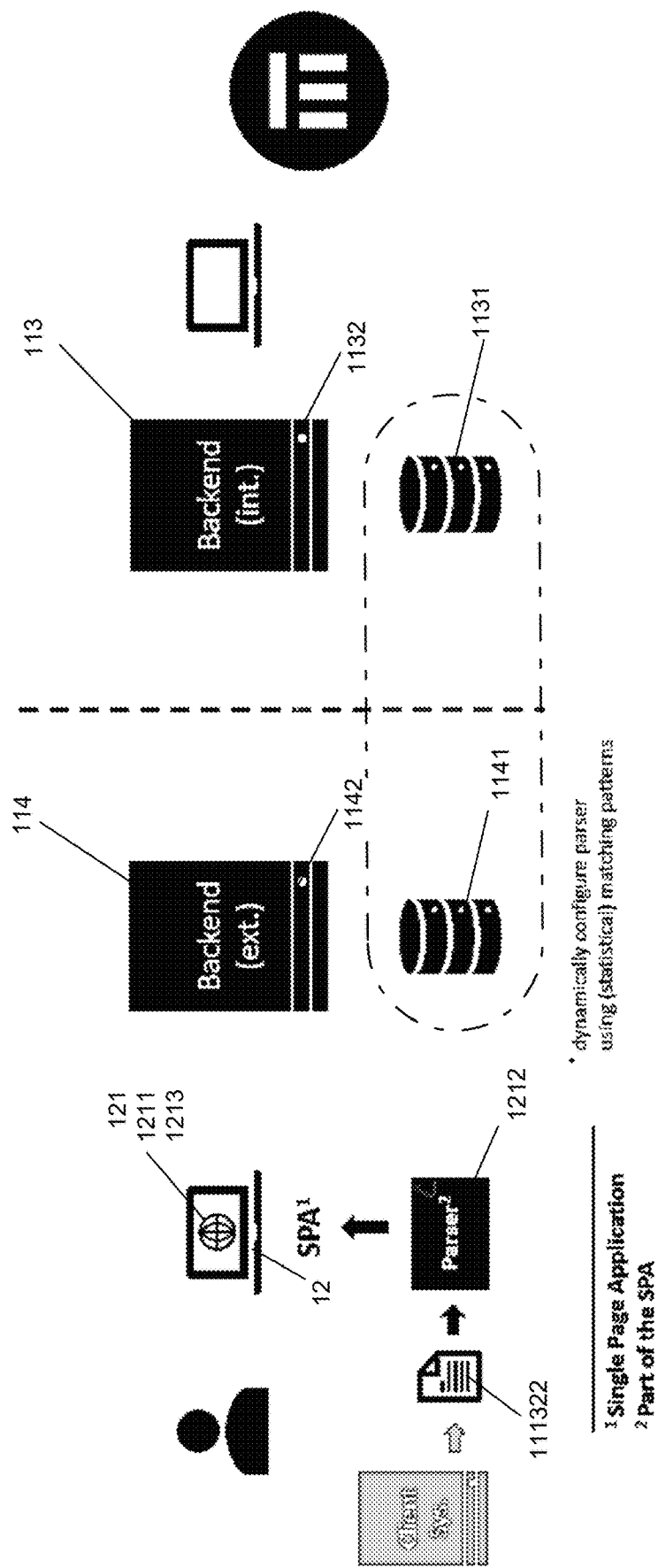
Figure 8B:
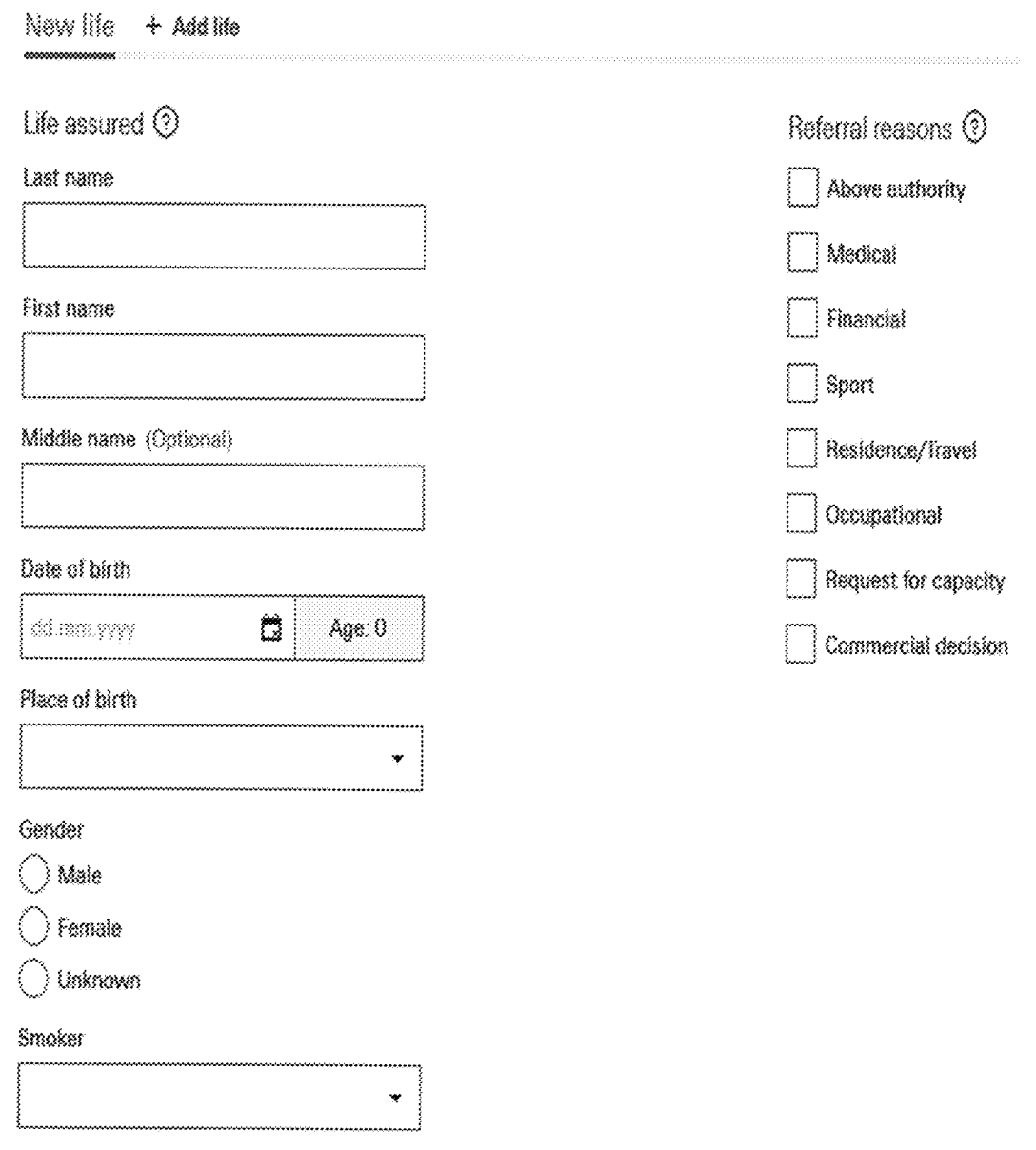
Figure 8D:
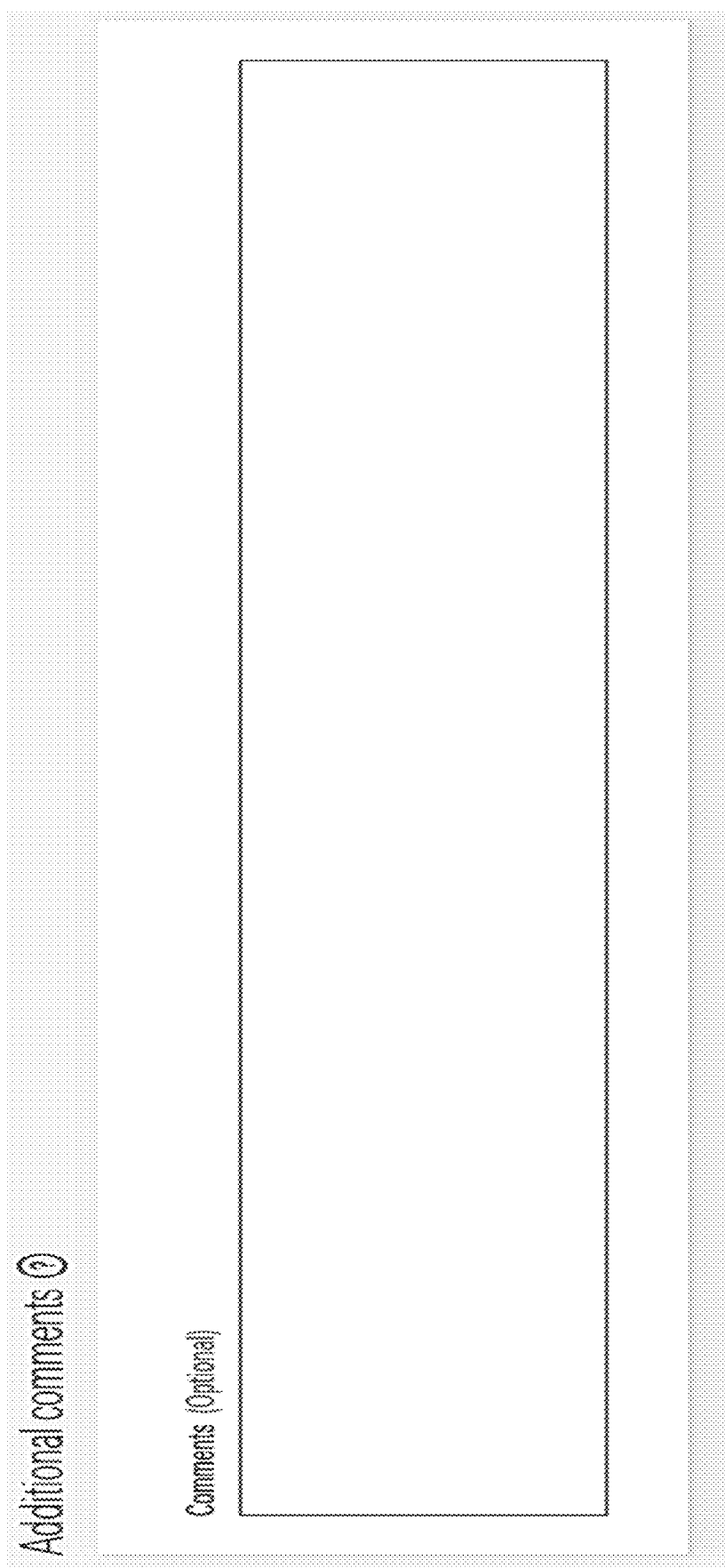
Figure 9:

The parser-matcher logic comprises an extraction module 11141 for extracting structured data content 1123 of the unstructured data content 1122 transferred in the formatted file by capturing data values from raw data of the unstructured data content 1122 connecting data fragments scattered in the unstructured data content 1122 and storing the extracted structured data content 1123 in a parseable data file format for further processing in a persistence storage 112/1131/1141. It is to be noted that as an embodiment variant, the formatted file 1113221 can also be directly transferred as the structured data content 1123 via the second digital transmission channel 11132, the structured data content 1123 be only transferrable if following a predefined syntactical and semantical format recognizable by the parser-matcher logic 1114. The parseable data file format can e.g. be realized as a language-independent data format using readable text data for storing and transmitting data objects comprising attribute-value pairs and/or array data types and/or any other serializable data values. The parseable data file format can further e.g. be realized as JavaScript Object Notation (JSON) format or YAML format or CSV (Comma-separated values) format. Thus, in the example of FIGS. 4 and 5 illustrating schematically an exemplary system 1 according to the invention, the invention comprises the following features extending the basis system of FIGS. 2 and 3: (i) Extract structured data (e.g. JavaScript Object Notation (JSON)) from a Portable Document Format (PDF) by means of the extraction module 11141 (alternatively a structured file can be uploaded directly); (ii) Parse the structured JSON (key-value) content; (iii) Map and populate the data into the submission form low latency implementation (front-end only). This enables the user to securely upload a document (PDF) with a structured file (JSON) attached or the structured file as such, which is extracted by the inventive system 1 and its content used to populate the input form. The structured content however is required to follow a certain syntactical and semantical format to be recognizable by the parser/matcher logic. The process of extracting the structured data (e.g. JavaScript Object Notation (JSON)) from the formatted pdf-file is a process of deserialization by extracting structured data from the unstructured content of a formatted file (e.g. pdf-file). FIG. 8 shows an exemplary GUI (Graphical User Interface) for capturing structured data (see e.g. under the labels "Case details" and "Life and products") and unstructured data embedded in a formatted file, e.g. a pdf-file (see label "Drag & drop file(s) or select file(s) here"). An extracted picture, as shown in FIG. 9, is accompanied by a structured JSON file, shown in FIG. 10, where the key-values can be extracted. In another preferred embodiment variant, the extraction of images and/or pictures out of the formatted file content comprises element recognition of elements included in an extracted image or picture by means of a pattern-recognition module 1112 (data processing 11121, data mining 11122, machine learning 11123, and neural network 11124), e.g. being based on machine-learning structures or artificial intelligence. It is to be noted, that the segmentation process can be a crucial step in the inventive extraction process, due to inherent difficulties and the possible importance of its results, which are decisive for the global efficiency of the system. The objective of segmentation is to individualize any different regions present in any particular image. One of the main concern is to technically structure the image segmentation process as a pattern recognition object, which, as an important practical corollary, implies that any method or technique from the pattern recognition field can, in principle, be applied to solve the segmentation problem. The present invention can further be realized providing a machine-based picture element recognition unit/device which adapts to the characteristics of the pattern to be recognized. A pattern recognition apparatus or module for pattern recognition, in which a pattern recognizer has plural recognition modes for comparing an unknown pattern with at least one known pattern, and a selector selects one of the plural recognition modes based on the characteristics of the pattern to be recognized. The selector may select the recognition mode based on the results of prior pattern recognition, and in particular, may select a recognition mode such that the discriminant function used in recognizing patterns is changed or such that a database comprises known patterns is changed. The pattern recognizer can comprise plural different discriminant functions by which a candidate is assigned to an unknown pattern, and one of the plural different discriminant functions is selected in accordance with at least one characteristic of the unknown pattern. The characteristics by which one of the different discriminant functions is selected may include characteristic parameters as measured size of the selected region of the image, measured predominating color(s) and measured image quality etc., and the different discriminant functions may include a Mahalanobis distance function, a mean square distance function and a mean absolute distance function. The pattern recognizer can include a first, second or more databases of known patterns, and in which one of the databases is selected based on the quality of the unknown pattern to be recognized.

For the pattern recognition, as embodiment variant a system insensitive to translation, rotation, scale can be used. In image data processing (e.g. 256×256 pixels), however, it is technically difficult to perform simulations of such a system because the system with a preprocessing part becomes huge. As a solution, location and extraction of the center of images e.g. taken out of an image scan, can be done. Furthermore, image data can be taken in from the automatic coin classification device and no change in size. For the invention to form rotation invariant pattern recognition systems by using neural networks, the neural network based rotation invariant systems can be realized by means of the following learning structures: (A) Preprocessing (mathematicaltransform)+BP (Transform model); (B) Preprocessing (neuralnet)+BP (Slab model); (C) Preprocessing (edge-detectiveneuralnet)+BP with link weight (Edge detection model) (D) BP with link weight (BP model); and (E) BPwithfeedbackconnections (Feedback model). BP means the error back-propagation method. The Fourier transform is utilized as a mathematical transform in (A). An improved slab architecture proposed by Widrow is used as a preprocessing. The preprocessor in (C) extracts edge features of coin images. This can be regarded as a procedure of feature detection performed in the visual field of brains. The BP with link weight in (C) and (D) has a structure of link weight which can be insensitive to rotation of input patterns and cannot change output values of its network. The methods of (A) to (D) require relatively many computations. Therefore they need a kind of technique to reduce it. The section 6 presents a method to reduce a computational complexity for the transform model (A). The method of (E) is different approach from the others and tries to learn and recognize rotated coin images using a network with feedback connections. This network achieves reduction of computational quantity by using a simple architecture without any preprocessor. (B) and (C) in the above mentioned systems finally aim at modeling brain functions. (A) is a system for the purpose of application to real machines in an engineering point of view. (E) is a system trying to achieve both.

As an embodiment variant, the pattern recognition system consists of two parts, a fixed preprocessing network (Box of slabs) and a trainable a-CONE network, as shown in. The conventional system is insensitive to rotation only by 90 degree but the present systems can be invariant to rotation by any degree. The preprocessor (Box of slabs) is composed of many slabs. Each slab includes many neuron and one majority vote taker. The circles labeled "N" in the preprocessor indicate the sigmoid neuron units and "M" is the majority vote taker. It is also possible to produce an analog output value, which is different from the conventional system. The sigmoid voting can be invariant to change of input signals and noise tolerant. This sigmoid neuron unit has input connections with the same value. Each slab in the preprocessor produces a single output, which is an input signal to the trainable multi-layered a-CONE neural network. Therefore the number of input units in the a-CONE network is the same as the number of slabs in the preprocessor. The problem is how to determine weights of each neuron unit in order to obtain rotation invariant slab outputs. The rotational system with many slabs. Invariance by 90 degree are known, however, the present invention extends the prior art system to be invariant to rotation by any degree. In implementing it, there are two ways in arrangement of neural weights of slabs, namely 2-dimensional grid and circular arrangements. The square array (grid arrangement) would be better to extend the conventional system and to treat translation. However the circular arrangement of neural weights is better to consider only the rotational invariance and achieve high recognition accuracy. For the present invention, both arrangements can be used.

The architecture of a preprocessor insensitive to rotation by 90 degree is described in the following. A slab structure achieves rotational invariance by 90 degree. Four neurons have weights with grid arrangement and the number of the weights is the same as the number of pixels on a retina. Pattern pixels on the retina are weighted by connection weights to compute the sum. It is passed through a nonlinear function to produce an output value of one of four neurons. First, a weight matrix W of the neuron 1 is determined by random numbers. Next, the weight matrix W is rotated by 90 degrees, which is the weights R90(W) of the neuron 2. In the same way, 180 degrees rotated weights R180(W) and 270 degrees rotated weights R270(W) are formed, which are the weight matrices of the neurons 3 and 4, respectively. Relationship between the weights W and the others can be a relation of 3×3 matrix case. They are the same except rotated by 90 to 270 degrees rotated. A pattern on the retina is fed to every neuron of the slab. Each pixel of the pattern is weighted by a corresponding weight of a neuron unit in the slabs. The sum is the net input signal to the neuron and the neuron output is the output value of one of the neurons 1 to 4. Their outputs are weighted equally and are insensitive to every 90 degrees rotation because its rotation changes only the roles of the neurons 1 to 4.

The parser-matcher logic 1114 comprises a parser 11142 parsing the extracted structured data content 1123 for key-values 11231, mapping and populating the key-values 11231 and/or extracted structured data content based on a pre-defined form structure 11232. It is to be noted that the web-client application 121 respectively the Single page application (SPA) 1211 can comprise the parser 1212, thus being part of web-client application 121 or single page application 1211. The predefined form structure 11232 can e.g. be a submission form structure 11233 of an underwriting system 117 or an automated claim submission and valuation system 118. The parser 11142 and/or the parser-matcher logic 1114 can e.g. comprise a separate lexer 11143 lexing or tokenization the extracted structured data content by converting a sequence of an extracted structured data content in sequence of tokens or key-values assignable and identifiable by the parser 11142.

As an embodiment variant, the digital multi-channel back-end system 11 comprises a distributed structure comprising an internal digital back-end system 113 with a persistence storage 1131 and a core engine 1132 and an external digital back-end system 114 with a persistence storage 1141 and a core engine 1142. Structured data content 1121 of the first digital transmission channel 11131 and extracted structured data content 1123 of the second digital transmission channels 11132 belonging to different external digital back-end systems 114 and stored in the persistence storages 1141 are loaded as integrated structured data contents 1121/1123 into the persistence storage 1131 of the internal digital back-end system 113 In this embodiment variant, the web-client applications 121 running on the network-enabled devices 12 are communicating with the respective associated external digital back-end system 114 (cf. FIGS. 3 and 5).

In an extended embodiment variant, the parser-matcher logic 1114 can e.g. be extended to heuristically determine availability of structured data content 1123 using a syntactical analysis process. The parser-matcher logic 1114 can then be dynamically configured based on the extracted structured data content 1123 using key-value pairs which are mapped based on key-values 11414 of the structured data content 1123 stored in the external digital back-end systems 114 paired with the key-values 11314 stored in the internal digital back-end systems 113. The mapping can e.g. be performed probabilistically on attribute level. Additionally to the extended embodiment variant or as an embodiment variant as such, the parser-matcher logic 123 comprising the data extraction module 1231, the parser 1232, and the lexer 1233 can e.g. realized as a part of a client system and/or web-client applications 121 running on front-end network-enabled devices 12. The dynamic configuration can e.g. be provided by the internal digital back-end systems 113 or the external digital back-end systems 114 to the client system and/or web-client applications 121 running on front-end network-enabled devices 12. The parser configuration by the can e.g. comprise different levels of sophistication at least comprising naïve probabilistic data processing or other applicable probabilistic data processing. The naïve probabilistic data processing can e.g. comprise applying naïve Bayes classifiers based on Bayes' theorem with strong naïve independence assumptions between the features, the Bayesian network model coupling with kernel density estimation.

The operation of extracting the structured data content 1123 from the unstructured data content 1122 of the formatted file 1113221 can e.g. be realized at least as a part of a data warehousing process of a data warehouse environment provided by the digital multi-channel back-end system 11. The persistence storage 112/1131/1141, in this case, at least comprise a data warehouse 1124 as central repositories for integrated structured data content 1123 from one or more transferred, disparate unstructured data contents 1122, and wherein structured data content 1123 is transformed and loaded into the data warehouse 1124 of the persistence storage 112/1131/1141 for the dynamic configuration of the parser-matcher logic 1114. The process of extracting the integrated structured data content 1123 can e.g. be performed at least repetitively and/or in a periodic time interval supplying all changed data to the data warehouse 1124 and keep it up-to-date. Moreover, the source system typically cannot be modified, nor can its performance or availability be adjusted, to accommodate the needs of the data warehouse extraction process.

Further, the core engine of digital multi-channel back-end system 111 and/or the parser-matcher logic 1114 can e.g. comprise a recognizer 1115 scanning and recognizing the key-values 11231 and/or extracted structured data content based on the predefined form structure 11232 as possible or not possible data values dynamically modifying the mapping and populating by the parser 11142.

| List of reference signs |
|---|
| 1 Digital multi-channel platform |
|   11 Digital multi-channel back-end system |
|     111 Core engine of digital multi-channel back-end system |
|       1111 Central Processing Unit |
|       1112 Pattern recognition/matching module |
|         11121 Data Processing |
|         11122 Data Mining |
|         11123 Machine Learning |
|         11124 Neural Network |
|       1113 Data transfer structure |
|         11131 First digital transmission channel |
|           111311 Form-based data-entry |
|           111312 Form-based data-transmission |
|         11132 Second digital transmission channel |
|           111321 Unstructured file-based data-entry |
|           111322 Unstructured file-based data-transmission |
|             1113221 Formatted file comprising unstructured data content |

-continued

| List of reference signs |
|---|

1113222 Portable, platform-independent formatted file comprising unstructured data content
           1113223 File in Portable Document Format (PDF)
      1114 Parser-matcher logic
        11141 Structured data extraction module
        11142 Parser
        11143 Lexer
      1115 Recognizer
    112 Data store/ Persistence storage
      1121 Structured data content
        11211 Structured data content submission 1
        11212 Structured data content submission 2
        1121i Structured data content submission i
      1122 Unstructured data content
        11221 Unstructured data content submission 1
        11222 Unstructured data content submission 2
        1122i Unstructured data content submission i
      1123 Extracted structured data content
        11231 Extracted key-values
        11232 Predefined form structure
        11233 Submission form structure
      1124 Data warehouse / Central repository environment
    113 Internal digital back-end system
      1131 Persistence storage of the internal back-end system
        11311 Structured data content
        11312 Unstructured data content
        11313 Extracted structured data content
        11314 Extracted key-values
      1132 Core engine of the internal digital back-end system
    114 External digital back-end system
      1141 Persistence Storage of the external back-end system
        11411 Structured data content
        11412 Unstructured data content
        11413 Extracted structured data content
        11414 Extracted key-values
      1142 Core engine of the external digital back-end system
    115 Bidirectional data exchange gateway
    116 Network interface
    117 Automated underwriting (UW) system
    118 Automated claim submission and valuation system
  12 Front-end network-enabled devices/client systems
    121 Web-client application
      1211 Single page application (SPA)
      1212 Parser (Part of web-client application or single page application)
      1213 Graphical user data interface
    122 Network interface
    123 Parser-matcher logic
      1231 Structured data extraction module
      1232 Parser
      1233 Lexer
  13 Data transmission network
  14 Sensory and Measuring devices
    141 (IoT) Sensory (input devices and sensors)
    142 Image/pattern recognition based measurement
    143 Data Transmission Interface
  15 Risk Generator
    151 Data storage
2 Event-exposed Real-world Object
  21 Digital Replica of the Real-World Object
    211 Simulation
    212 Synchronization
  22 Linking: Sensory/Measuring/Data Acquisition
3 World Environment and Ecosystem
  31 Subsystems and Components of the World Environment and Ecosystem
    311, 312, 313,..., 31i Subsystems
  32 Geographical or topological Subsystems/Subregions or Grid
    321, 322, 323,..., 32i Geographical or Topological Grid Cells
  33 Impacting Real World Events

The invention claimed is:

1. A digital multi-channel platform, comprising:
a digital multi-channel back-end system; and
a multi-channel, high-layer data-transfer structure accessible by web-client applications running on front-end network-enabled devices and providing discrete high-layer data-flow and capturing of structured and unstructured data content transferred from the front-end network-enabled devices over a data transmission network to the digital multi-channel back-end system, wherein the multi-channel, high-layer data-transfer structure includes:
  a first digital transmission channel including a form-based data-entry provided by a graphical user data interface of the web-client applications for the structured data content transmission from the network-enabled devices to the digital multi-channel back-end system, and
  a second digital transmission channel including a file-based data entry provided by the graphical user data interface for the unstructured data content transmission by a transferable file from the network-enabled devices to the digital multi-channel back-end system,
the digital multi-channel back-end system includes:
  a bidirectional data exchange gateway providing bidirectional data exchange for the structured and unstructured data content transmission between the digital multi-channel back-end system and the network-enabled devices, the bidirectional data exchange being steered and/or operated by a data validation/enrichment process of a central processing unit and/or core engine of the digital multi-channel back-end system, and
  a parser-matcher logic for scanning and recognizing the unstructured data content transferred by a formatted file via the second digital transmission channel, the unstructured data content of the transferred formatted file comprising at least text formatting and/or image formatting and/or sound formatting, and
the parser-matcher logic includes:
  an extraction module for extracting structured data content of the unstructured data content transferred in the formatted file by capturing data values from raw data of the unstructured data content connecting data fragments scattered in the unstructured data content, wherein the parser-matcher logic heuristically determines availability of structured data content using a syntactical analyses process, and storing the extracted structured data content in a parseable data file format for further processing in a persistence storage, and
  a parser parsing the extracted structured data content for key-values, and mapping and populating the key-values and/or the extracted structured data content based on a predefined form structure, the parser-matcher logic being dynamically modified based on the extracted structured data content using key-value pairs which are mapped based on key-values of the structured data content, wherein the parser-matcher logic comprises a recognizer scanning and recognizing the key-values and/or extracting structured data content based on the predefined form structure dynamically modifying the mapping and populating by the parser.

2. The digital multi-channel platform according to claim 1, wherein the parseable data file format is a language-independent data format using readable text data for storing and transmitting data objects comprising attribute-value pairs and/or array data types and/or other serializable data values.

3. The digital multi-channel platform according to claim 2, wherein the parseable data file format is JavaScript Object Notation (JSON) format or Extensible Markup Language (XML) format or YAML format or CSV (Comma-separated values) format.

4. The digital multi-channel platform according to claim 1, wherein the predefined form structure is a submission form structure of an underwriting system or an automated claim submission and valuation system.

5. The digital multi-channel platform according to claim 1, wherein the parser and/or the parser-matcher logic include a separate lexer lexing or tokenizing the extracted structured data content by converting a sequence of the extracted structured data content in sequence of tokens or key-values assignable and identifiable by the parser.

6. The digital multi-channel platform according to claim 1, wherein the core engine and/or the parser-matcher logic include a recognizer scanning and recognizing the key-values and/or the parseable data file format and/or the extracted structured data content based on the predefined form structure as possible data values or not possible data values dynamically modifying the mapping and populating by the parser.

7. The digital multi-channel platform according to claim 1, wherein
the formatted file is directly transferred as the structured data content via the second digital transmission channel, and
the structured data content is only transferrable if it follows a predefined syntactical and semantical format recognizable by the parser-matcher logic.

8. The digital multi-channel platform according to claim 1, wherein
the digital multi-channel back-end system includes:
  an internal digital back-end system with a persistence storage and a core engine, and
  an external digital back-end system with a persistence storage and a core engine,
the structured data content and the extracted structured data content stored in persistence storages of different ones of a plurality of the external digital back-end system are loaded as integrated structured data contents into the persistence storage of the internal digital back-end system, and
the web-client applications running on the network-enabled devices communicate with respective ones of the plurality of the external digital back-end system.

9. The digital multi-channel platform according to claim 8, wherein
the parser-matcher logic is extended to heuristically determine availability of extractable data content using a syntactical analysis process, and
the parser-matcher logic is dynamically configured based on the extracted structured data content using key-value pairs which are mapped based on key-values of the extracted structured data content stored in the plurality of the external digital back-end system paired with key-values stored in the internal digital back-end system.

10. The digital multi-channel platform according to claim 9, wherein the mapping is performed probabilistically on an attribute level.

11. The digital multi-channel platform according to claim 9, wherein the parser is a part of a client system and/or the web-client applications running on front-end network-enabled devices.

12. The digital multi-channel platform according to claim 11, wherein the dynamic configuration is provided by the internal digital back-end system or the plurality of the external digital back-end system to the client system and/or the web-client applications running on front-end network-enabled devices.

13. The digital multi-channel platform according to claim 9, the dynamic configuration includes different levels of sophistication at least comprising naïve probabilistic data processing or other applicable probabilistic data processing.

14. The digital multi-channel platform according to claim 13, wherein the naïve probabilistic data processing includes applying naive Bayes classifiers based on Bayes' theorem with strong independence assumptions between features.

15. The digital multi-channel platform according to claim 9, wherein
the extracting the structured data content from the unstructured data content of the formatted file is realized at least as a part of a data warehousing process of a data warehouse environment provided by the digital multi-channel back-end system,
the persistence storage at least includes a data warehouse as a central repository for the integrated structured data content from one or more transferred, disparate unstructured data contents, and
the structured data content is transformed and loaded into the data warehouse of the persistence storage for the dynamic configuration of the parser-matcher logic.

16. The digital multi-channel platform according to claim 15, wherein the integrated structured data content is extracted at least repetitively and/or in a periodic time interval supplying all changed data to the data warehouse.

17. The digital multi-channel platform according to claim 1, wherein the formatted file is a portable, platform-independent formatted file comprising the unstructured data content.

18. The digital multi-channel platform according to claim 17, wherein
the formatted file is a PDF-file in a portable document format comprising the unstructured data content, and
the PDF-file encapsulates a description of a fixed-layout flat document at least comprising text content and fonts and/or vector graphics and/or raster images and/or further format-relevant information.

19. The digital multi-channel platform according to claim 18, wherein the PDF-file includes further content besides flat text and/or graphics including logical structuring elements and/or interactive elements and/or three-dimensional objects.

20. The digital multi-channel platform according to claim 19, wherein the interactive elements include annotations and form-fields and/or layers and/or rich media comprising video content.

21. The digital multi-channel platform according to claim 20, wherein the three-dimensional objects use Universal 3D (U3D) format or Product Representation Compact (PRC) format.

22. The digital multi-channel platform according to claim 18, wherein the description further comprises encryption and/or digital signatures and/or file attachments and/or metadata to enable workflows requiring these features.

* * * * *